United States Patent [19]
Mallet

[11] Patent Number: 4,462,524
[45] Date of Patent: Jul. 31, 1984

[54] ENDLESS CHAIN CONVEYOR

[75] Inventor: Bernard Mallet, Limay, France

[73] Assignee: Nadella, Rueil Malmaison, France

[21] Appl. No.: 315,472

[22] Filed: Oct. 27, 1981

[30] Foreign Application Priority Data

Oct. 27, 1980 [FR] France ................................ 80 22903

[51] Int. Cl.³ ............................................ B65G 39/20
[52] U.S. Cl. ................................................... 198/845
[58] Field of Search ....................... 198/852, 838, 845;
308/3 R, 3.6, 3.8, 3.5, 208, 6 R, 187.2, 190, 191;
384/295

[56] References Cited

U.S. PATENT DOCUMENTS 2,526,563 10/1950 Keen .................................... 198/845
4,049,308 9/1977 Martin .............................. 198/845 X
4,249,649 2/1981 Kraft ................................ 198/845 X Primary Examiner—Joseph E. Valenza
Assistant Examiner—Dennis J. Williamson
Attorney, Agent, or Firm—Robert E. Burns; Emmanuel J. Lobato; Bruce L. Adams

[57] ABSTRACT

The conveyor comprises an assembly of links each of which links comprises two longitudinally extending bars articulated to two opposed trunnions of a cross-member the other two opposed trunnions of which act as an articulation to the bars of an adjacent link. Each trunnion is capped by a carrying or steering roller which rolls along a track carried by a guide rail. The roller includes a rolling bearing having cylindrical rolling elements and in particular needles.

4 Claims, 3 Drawing Figures

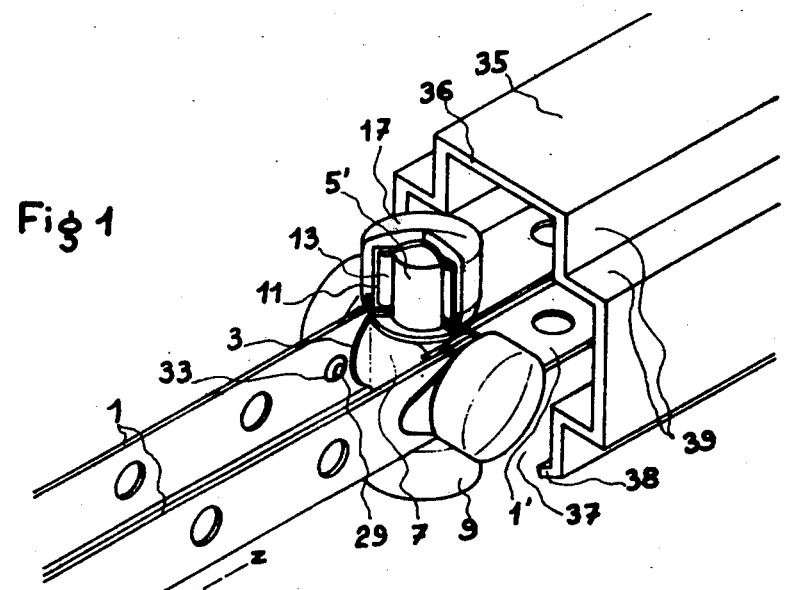
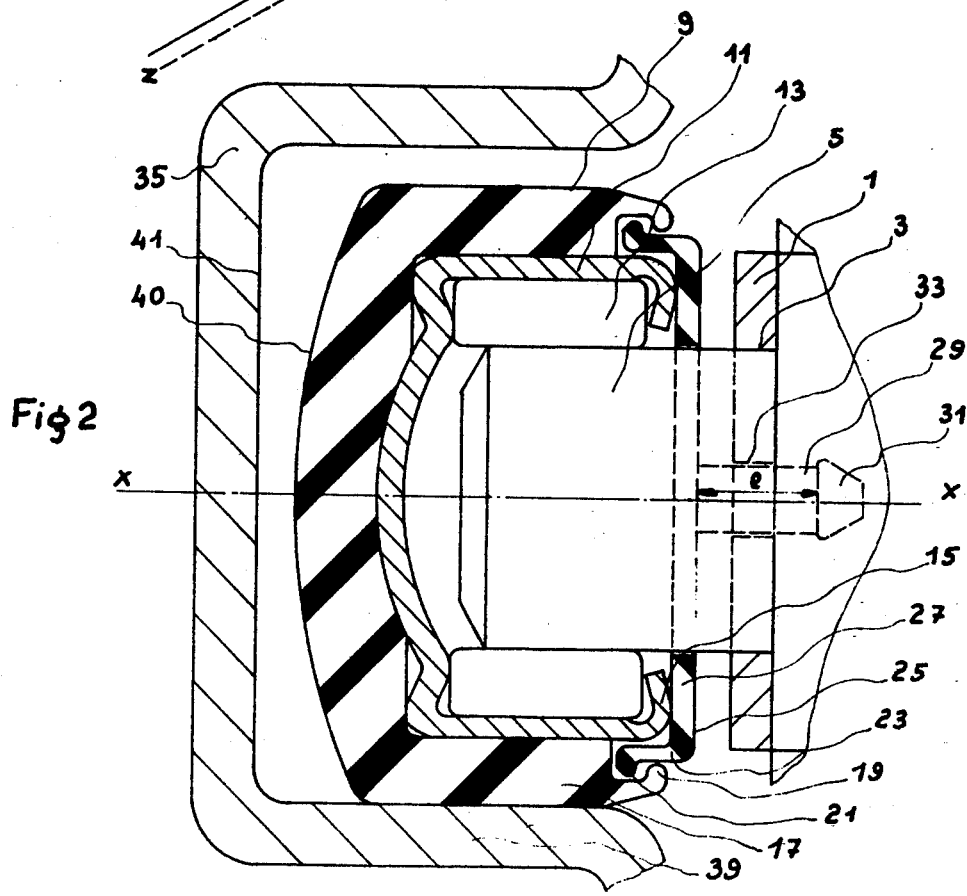

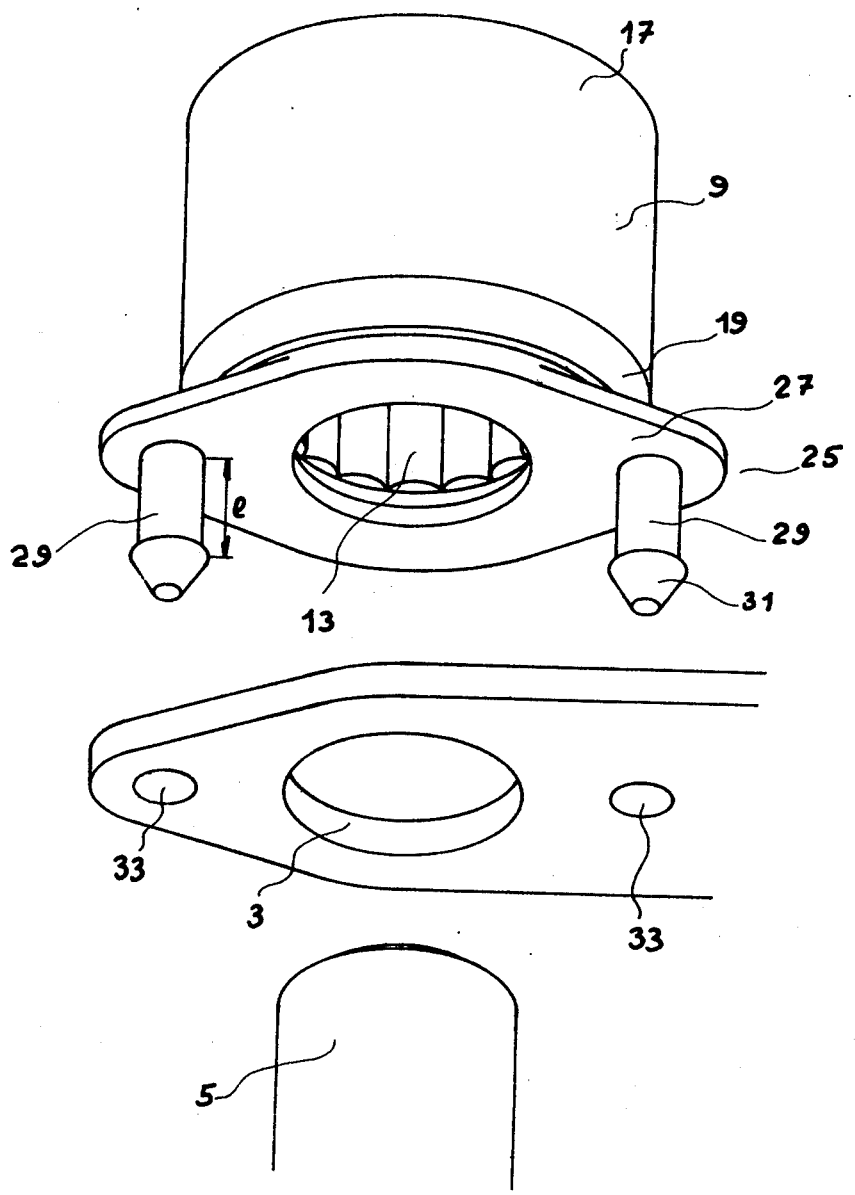

ENDLESS CHAIN CONVEYOR

DESCRIPTION

The present invention relates to endless chain conveyors and more particularly to such conveyors provided with articulations including spider members.

Conveyors of this type are known which comprise links pivoted together on spider members whose trunnions are capped by rollers adapted to roll along a section-member.

In conveyors having a non-exclusively linear circuit, skidding in the bends is eliminated by the use of rollers constituted by special ball bearings whose outer race is capable of undergoing a swivelling movement.

Apart from the high cost of such special rolling bearings, the use of balls results in an increased size and in particular an increased radial size of the assembly comprising the articulated links and the section-member so that there is a corresponding increase in weight and consequently an increase in the price of the conveyor and above all of its installation if it is intended, as is usually the case, to be mounted in a suspended manner.

The conveyors of the aforementioned type have consequently an excessive overall size for conveying medium or small loads and any attempt to reduce the dimensions of the special rollers results in a prohibitive price.

An object of the present invention is to overcome the aforementioned drawbacks and to provide a cheap conveyor formed by articulated links and a section-member which has reduced dimensions, and consequently reduced weight, with the use of mass-produced rollers, said endless chain conveyor, constituted by an assembly of links each of which comprises two longitudinal bars articulated to two opposed trunnions of a spider member the other trunnions of which act as an articulation for the bars of an adjacent link, each trunnion being capped by a carrying or steering roller which is capable of rolling along a track carried by a guide rail, wherein the aforementioned roller comprises a rolling bearing having cylindrical rolling elements and in particular needles.

According to a first feature of the invention, the roller comprises the aforementioned rolling bearing which is fitted in a cup of plastics material.

Further features and advantages of the present invention will be more clearly apparent from the ensuing description of one embodiment which is given solely by way of example and represented in the accompanying drawings in which:

FIG. 1 is a perspective view, with a part cut away, of the articulation of two adjacent links of a conveyor according to the invention;

FIG. 2 shows, to an enlarged scale, the component elements of a carrying roller bearing against a portion of the guiding section-member;

FIG. 3 shows the device for mounting the roller on the bar.

The endless chain conveyor according to the invention comprises an assembly of links, each of which comprises two longitudinal bars 1 provided adjacent their ends with aligned apertures 3 which are adapted to receive two opposed trunnions 5 of a spider member 7 for the purpose of their articulation about a first axis, the other two trunnions 5' cooperating with the end portions of the bars 1' of the adjacent link which are offset at 90° to the first-mentioned bars for the purpose of their articulation about an axis perpendicular to the first-mentioned axis.

Each trunnion is capped by a roller 9 comprising a rolling bearing including a press-formed sheet metal sleeve 11 having a closed end wall provided with a ring arrangement of cylindrical rolling elements 13, and in particular needles, which are axially retained with respect to the axis X—X by an inner radial flange 15, this sleeve being fitted in a cup 17 of plastics material which also has a closed end wall which is preferably outwardly crowned. The mounting of the cup is achieved by the cooperation, for example by a clipping together, of a bead 19 provided on the end thereof adjacent the bar 1 and an outer radial flange 21 on the axially extending wall 23 of a washer 25 which is also of plastics material and includes a substantially planar base 27 which surrounds the aperture 3 for the passage of the trunnion through the bar with respect to which it is prevented from rotating by two studs 29 which are located on the opposite side of the wall 23 and cooperate, also by a clipping assembly, owing to their enlarged end portions 31, with two apertures 33 formed in the bar on each side of the aperture 3, said studs having a length "l" which allows the washer an axial play.

The chain of links described hereinbefore is inserted in a guide rail 35 which is preferably made from rolled sheet metal or from drawn aluminium alloy and which has in its rectilinear portion a cross-shaped section 36 having orthogonal walls provided with a single opening 37 which extends longitudinally in the direction ZZ and is defined by two oblique flanges 38 against which flanges the adjacent steering roller bears tangentially.

The side wall 39 of the four branches thus formed constitute tracks for the rollers which, in a horizontal disposition of the section-member, are subdivided into horizontal carrier rollers whose end wall, which is externally crowned 40, or has a stud (not shown), reduces the zone of contact with the end 41 of the corresponding branch, and vertical steering rollers.

It is clear from the foregoing description that the aforementioned clipping system ensures that the rollers are permanently retained on the bars, even outside the rail, and consequently permits an easy and rapid mounting and dismantling of the chain, for in particular replacing a portion of the chain. The system is simple especially because the use of a rail which is closed on three sides permits, owing to its cooperation with the end wall of the cup, avoiding a stress on the clipping together and consequently permits maintaining in this position a distance "d" between the head of the stud and the corresponding surface of the bar.

The dimensions of the rail are so determined that, in the bends, the centrifugal forces to which the chain is subjected are supported mainly by the steering rollers which correspondingly relieves the carrier rollers on which the forces resulting from their own weight are exerted.

As mentioned above, the use of needle bearings results in a marked reduction in the dimensions, the price and the weight and permits, on one hand, reducing the pitch of the chain and obtaining small radii of curvature and, on the other hand, producing curved portions of the rail by a bending thereof and avoiding machining operations.

Note that the stacked assembly of the washer and the cup combined with the use of a closed rail eliminates leakages of lubricant and protects the rollers from exterior soiling while the contact between the metal and plastic of the cup on the rail considerably reduces the noise level in operation.

It will be understood that the means described and illustrated have been given merely by way of examples and may consequently be replaced by equivalent means without departing from the scope of the invention defined in the claims.

Thus the combined use of a rail having open sides with the clipping system described hereinbefore may be envisaged, the latter being capable in certain applications of withstanding the axial loads on the rollers in operation.

Further, the mounting of the roller may be replaced, in a modification, by a cup whose end wall is extended internally by a stud which is assembled therewith or in one piece therewith and axially extends through the pressed-out sleeve which is devoid of an end wall, and is clipped in a centre cavity formed in the adjacent end of the trunnion so that it is possible to dispense with the washer employed in the assembly described hereinbefore.

Having now described my invention what I claim as new and desire to secure by Letters Patent is:

1. In an endless chain conveyor comprising an assembly of links, each link comprising a pair of longitudinally extending bars, spider members, each spider member comprising a first pair of opposed first trunnions, which trunnions are substantially horizontal and define an articulation with a corresponding pair of said bars, carrier rollers capping said first trunnions, a second opposed pair of second trunnions, which second trunnions are substantially vertical and define an articulation with an adjacent pair of said bars, steering rollers capping said second trunnions, and the carrier and steering rollers being capable of rolling along a track carried by said guide rail; the improvement wherein each roller comprises a combination of a rolling bearing and a cup of plastics material, the rolling bearing comprising cylindrical rolling elements and a press-formed sleeve provided with a radial flange for axially retaining the rolling elements, and the cup of plastics material being mounted on said sleeve, each roller having a bead connected to the cup, and being combined with a washer, and means for preventing rotation of the washer with respect to a corresponding adjacent bar, each roller being mounted by a clipping together of said bead and said washer.

2. A conveyor according to claim 1, comprising two studs on said washer, two apertures defined in a corresponding bar adjacent one end of said corresponding bar and on each side of an aperture for the passage of the corresponding trunnion, which aperture surrounds the base of said washer, the washer being prevented from rotation by engagement of said studs in said two apertures.

3. A conveyor according to claim 1, wherein the side of the washer adjacent to the corresponding roller is extended by an axially extending wall which terminates in a radial flange against which radial flange the bead connected to the cup is clipped.

4. A conveyor according to claim 2, wherein the side of the washer adjacent to the corresponding roller is extended by an axially extending wall which terminates in a radial flange against which radial flange the bead connected to the cup is clipped.

* * * * *